(12) United States Patent
Politino et al.

(10) Patent No.: US 7,320,280 B2
(45) Date of Patent: Jan. 22, 2008

(54) PITTING MACHINE COMPRISING A PUNCHING HEAD WHICH PERFORMS A CURVILINEAR OSCILLATORY MOVEMENT IN SYNCHRONIZATION WITH THE TRANSLATION MOVEMENT OF FRUITS TO BE PITTED

(76) Inventors: Mauricio Francisco Politino, Gutierrez 947, Godoy Cruz, Mendoza (AR) 5547; Juan Carlos Morsucci, Rosendo Silva 14, Gutierrez, Mendoza (AR) 5547

( * ) Notice: Subject to any disclaimer, the term of this patent is extended or adjusted under 35 U.S.C. 154(b) by 0 days.

(21) Appl. No.: 11/147,678

(22) Filed: Jun. 8, 2005

(65) Prior Publication Data
US 2005/0284311 A1  Dec. 29, 2005

(30) Foreign Application Priority Data
Jun. 24, 2004  (AR) .............................. 20040102208

(51) Int. Cl.
*A23N 3/00* (2006.01)
(52) U.S. Cl. .............................. 99/494; 99/547; 99/559; 99/561; 99/562; 99/565
(58) Field of Classification Search .................. 99/494, 99/516, 489, 534, 490, 547–566, 486; 426/484, 426/485
See application file for complete search history.

(56) References Cited

U.S. PATENT DOCUMENTS

| | | | | |
|---|---|---|---|---|
| 3,618,648 A | * | 11/1971 | Becq ............................ | 99/549 |
| 3,643,717 A | * | 2/1972 | Meissner et al. .............. | 99/562 |
| 3,695,322 A | * | 10/1972 | Anderson et al. .............. | 99/562 |
| 4,168,658 A | * | 9/1979 | Silvestrini ..................... | 99/551 |
| 4,290,350 A | * | 9/1981 | del ser Gonzalez ........... | 99/494 |
| 5,168,802 A | * | 12/1992 | Silvestrini et al. ............ | 99/587 |
| 5,370,174 A | * | 12/1994 | Silvestrini et al. ........ | 165/109.1 |
| 5,619,912 A | | 4/1997 | Silbermann | |
| 5,870,949 A | | 2/1999 | Cimperman et al. | |
| 5,992,310 A | * | 11/1999 | Castro .......................... | 99/516 |

* cited by examiner

*Primary Examiner*—Timothy F. Simone
(74) *Attorney, Agent, or Firm*—Volpe and Koenig, P.C.

(57) ABSTRACT

A pitting machine comprises a punching head that performs a curvilinear oscillatory movement in synchronization with the translation movement of fruits to be pitted, in particular for use in industries that process food such as pitted dried or dehydrated plums and which are currently performing manual operations or using rudimentary equipment.

22 Claims, 4 Drawing Sheets

PITTING MACHINE COMPRISING A PUNCHING HEAD WHICH PERFORMS A CURVILINEAR OSCILLATORY MOVEMENT IN SYNCHRONIZATION WITH THE TRANSLATION MOVEMENT OF FRUITS TO BE PITTED

FIELD OF INVENTION

The present invention relates to a pitting machine comprising a punching head which performs a curvilinear oscillatory movement in synchronization with the translation movement of fruits to be pitted. More specifically, it refers to an extraordinarily simple mechanism for the removal of pits from soft fruits such as dehydrated or fresh plums, dates, etc. This invention is particularly oriented to industries which process food such as pitted dried or dehydrated plums and which are currently performing manual operations or using rudimentary equipment.

Basically, the working principle is to put each of the fruits in individual containers consisting of a pair of jaws able to open and close, such jaws allowing entering of one fruit only. Said fruit is then alternatively compressed in a same direction in an attempt of reducing its volume by reducing cross-section thereof. This kind of movement allows for the fruit to be positioned with its main axis parallel to the compression planes. One end of the fruit is placed on a rubber and a punch is introduced into the other end in order to remove pit.

BACKGROUND

Plum and dates pitting equipment or apparatuses are known since more than twenty years, said equipment or apparatuses having been improved in terms of the mechanism actuating on the punch (punches) which penetrate the fruit, but said mechanism has always been based on a cam and eccentric. Said mechanisms, apart from requiring complex maintenance and being subject to wear, are unsafe per se, as they produce breakage of equipment parts which lead to extended periods for the repair thereof, with the corresponding costs. Also, such mechanisms, due to their conception, require lubrication, which may contaminate product. Even when using a food grade lubricant, foodstuff quality is reduced, as it typically can not be washed.

Many of the previous art mechanisms use spring punching heads, said springs being compressed most of the time, thus requiring power. Also, when the motor stops said springs relax suddenly, thus adding a risk factor for machine operators. Spring punching heads are also difficult to calibrate, as the synchronism to be attained between the conveyor belt and the head descending movement is so complicated that at least two individuals are necessary in order to configure same.

U.S. Pat. No. 5,619,912 discloses a pitting machine which conveyor belt is inclined as regards the horizontal plane, said machine includes a cam chamber able to rotate and which is associated to a pivot which carries out a pivoting movement in response to said cam box rotation and over which the punching head is associated. The whole assembly is positioned above the belt conveying fruits and inside the pitting machine.

U.S. Pat. No. 5,870,949 discloses a pitting machine which punching head is directly related to an eccentric which is associated to a cam, such assembly being positioned above the belt conveying fruits and inside the pitting machine. This includes a cleaning blade mounted on the machine frame, which blade loosens pits from containers as these move away from the extraction area.

Although it is desirable for the punch trajectory in pitting machines to be substantially perpendicular to the conveyor belt travel (and thence to the fruit travel), in order to provide a better extraction of pits the present invention provides a curvilinear trajectory of punch which exhibits a large curvature radius, which greatly resembles this kind of trajectory. The reason for this trajectory change is due to the novel combination of pit extraction mechanical elements employed, which confer the following advantages as regards prior art: they improve efficiency of the fruit pits extraction mechanism without requiring lubrication; they are placed outside the pitting machine, far from the fruit to be pitted; they use a spring-free punching head; they are formed with commercially available elements; pitting area is easily and safely accessed for inspection and cleaning purposes; they require low maintenance, requiring short machine shutdowns and long operating periods.

SUMMARY

Accordingly, it is an object of the present invention a pitting machine comprising:
- a chassis;
- a loading area;
- an unloading area;
- fruit traction, vibration, selection, separation and orientation means associated to said chassis;
- a closed loop conveyor belt;
- a plurality of fruit containers that alternatively close and open, said containers being mounted on said closed loop conveyor belt;
- a punching head positioned over said closed loop conveyor belt, an end of said punching head including a plurality of spring-free punches; and
- actuating means for said punching head, which means consist of at least two eccentrics mounted on a central axis arranged under the pitting area, said at least two eccentrics being positioned external to said chassis and each of them being articulately connected to at least one crankshaft and to one of the ends of an horizontal connecting rod, said crankshaft being in turn connected to one of the ends of a vertical connecting rod and the other of said ends of said vertical connecting rod articulated to one of sides of the end of said punching head which includes punches, each of the sides of the other end of said punching head being articulately associated to one of the ends of an oscillating post placed externally to such chassis, and the other end of said oscillating post being articulated with a pivot axis rigidly mounted on said chassis; also, both oscillating posts comprise in some point between their two ends a projection on which the other end of said horizontal connecting rod articulates.

The invention will be better understood when considered in reference to the drawings in which a preferred embodiment thereof is represented.

DETAILED DESCRIPTION OF THE PREFERRED EMBODIMENTS

Figure 1:
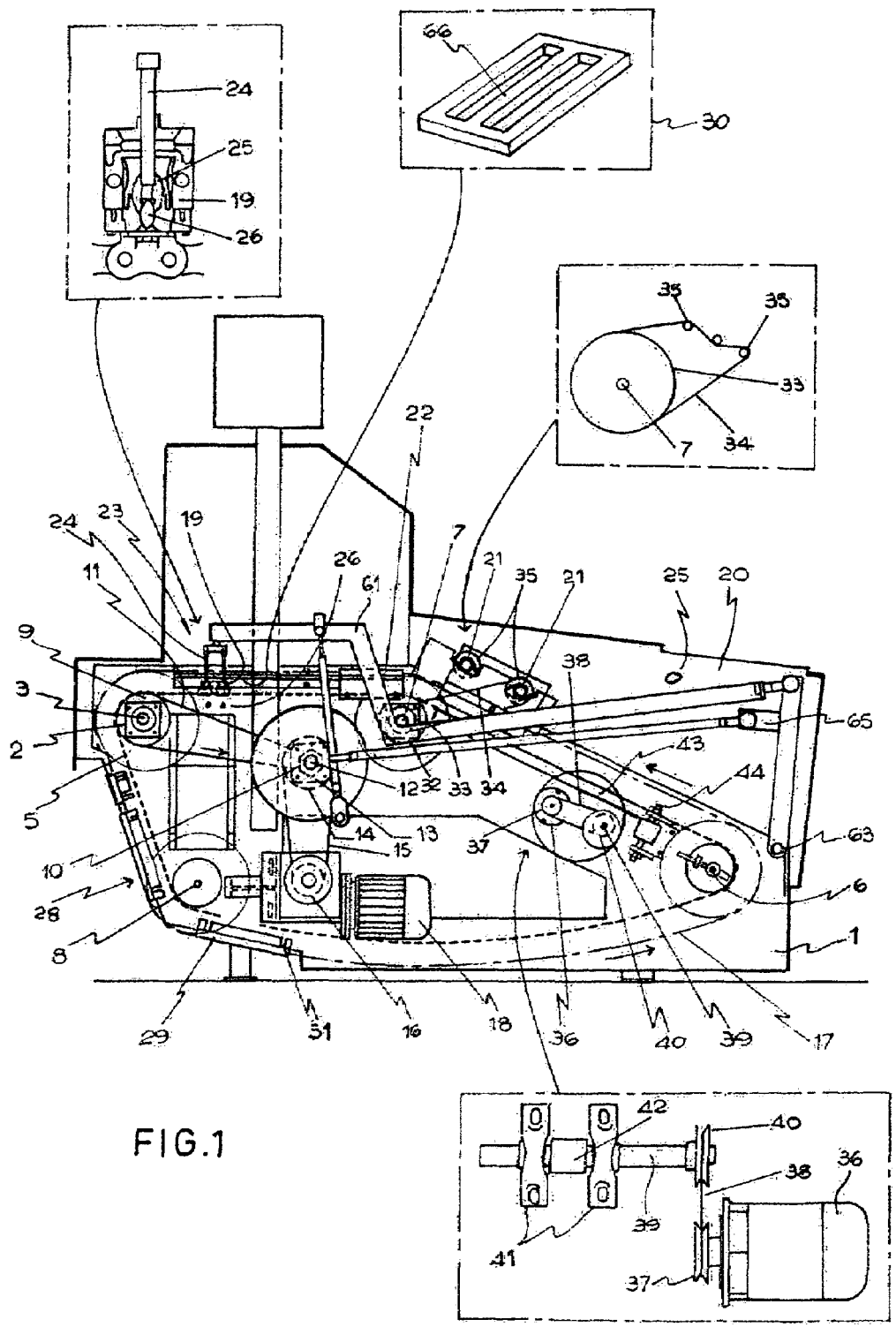
FIG. 1 is a side view of the pitting apparatus which is the object of this invention.
Figure 2:
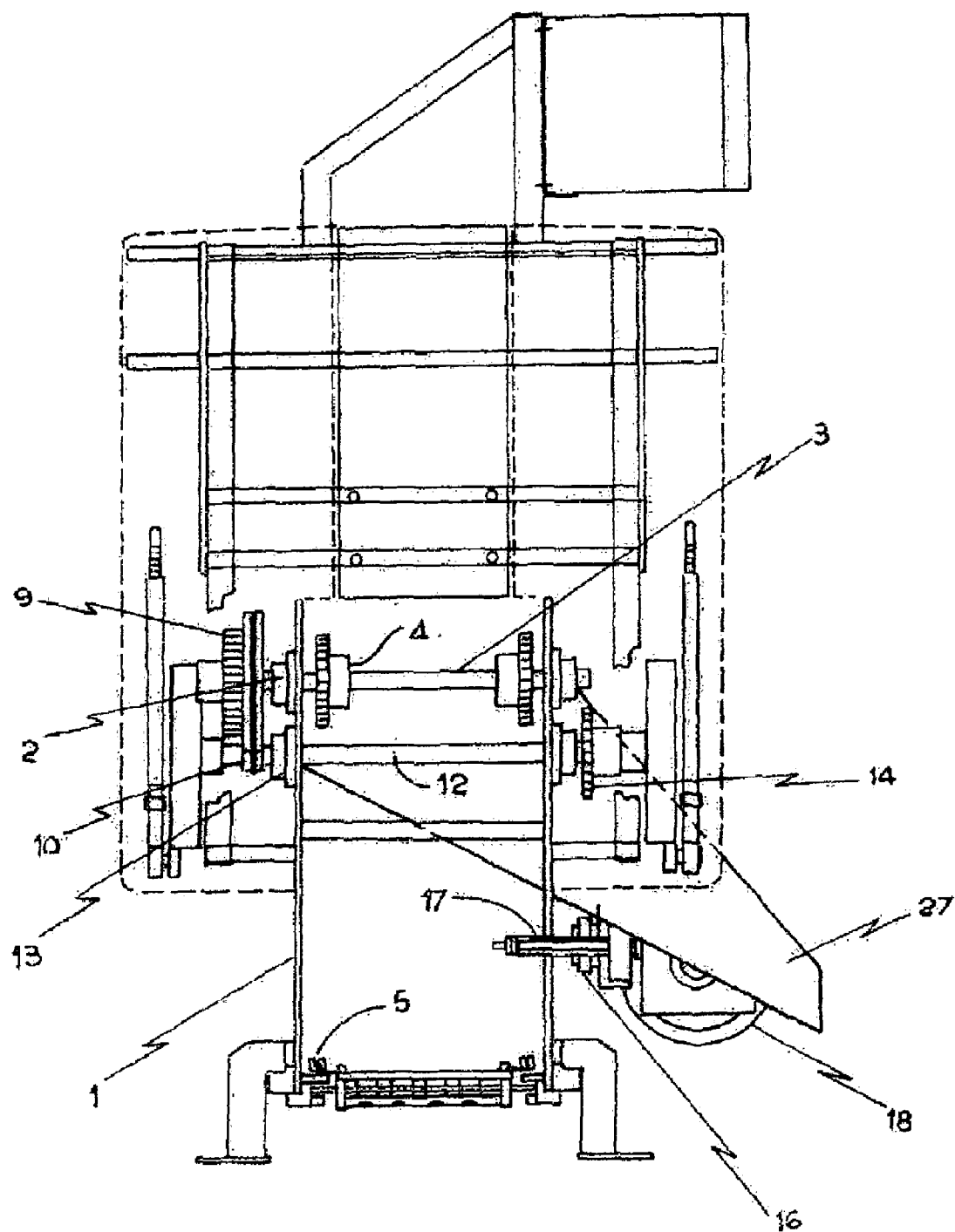
FIG. 2 is a front view of the pitting apparatus which is the object of this invention.

Said traction means are constituted by a main axis 3 mounted on bearings 2. Said main axis 3 supports gears 4 on each of the ends thereof, each of said gears pull a pair of closed loop parallel chains 5 which connect said main axis 3 to rear axis 6, intermediate axis 7 and return axis 8. Main axis 3 has a crown or gear 9 controlled or driven by a gear or pinion 10 which is mounted on a central axis 12 by means of a chain 11. Said central axis 12 is mounted on bearings 13 and is arranged under the pitting area 23. Said central axis 12 is controlled or driven through a gear 14 by means of chain 15 of a driving pinion 16 which is directly coupled to the overstress clutch of a reducing motor 18.

Traction means are in turn associated to a closed loop conveyor belt 17 housing fruit 25 containers 19. Said containers 19 are displaced from the loading area consisting of a loading bin 20, passing along the fruit 25 selection means constituted by rejecting brushes 21, which allow entering of one fruit 25 into each container 19 of the conveyor belt 17, passing then through fruit orientation means 22 and up to the pitting area 23 where there are separation means 30 and a plurality of punches 24 possessing an oscillatory movement which is almost perpendicular to conveyor belt 17. Said punches 24 pierce moving fruits 25 and remove pits 26. Conveyor belt 17 continues advancing towards the front of the machine and commences its return at the unloading area 28, where pitted fruits 25 fall under gravity. Unloading area 28 comprises an unloading bin 27 complemented by a sector 29 comprising a cam 31 which confers vertical vibration onto conveyor belt 17 in order for it to expel those fruits 25 not expelled at the unloading bin 27 itself.

Selection means are conformed by rejecting brushes 21 which are driven through said intermediate axis 7, which is actuated by effect of the same conveyor belt 17 which rests its chains 5 on gears 32. Said intermediate axis 7 bears another gear 33 mounted over it and which through chain 34 confers rotation to smaller gears 35 in turn mounted on the rejecting brushes axes 21.

On the other hand, there are also included vibration means at the loading area which favour entering of each of the fruits 25 into containers 19. Said vibration means are comprised of a motor 36 associated to a pulley 37 that through belt 38 rotates vibration axis 39 through pulley 40. Vibration axis 39 rests on bearings 41 and possesses in the central part thereof an eccentric counterweight 42 that upon rotation generates an orbital vibration which is transmitted to vibration axis 39 and this in turn to bearings 41 which are associated to tracks 43 where conveyor belt 17 is supported. Said tracks 43 also rest on regulators 44 which purpose is to limit and regulate vibration of tracks 43 and thus obtain the maximum yield in terms of fruits 25 entering into each of the containers 19.

On the other side, separation means 30 are placed above said fruit 25 containers 19 and under said punching head 61. Said separation means 30 are constituted by a plurality of parallel flat rods 66 spaced one from each other by a distance smaller than the diameter of each container 19 and larger than the diameter of each punch 24. Separation means 30 allow separation of fruits 25 from punches 24 after pitting.

Figure 3:
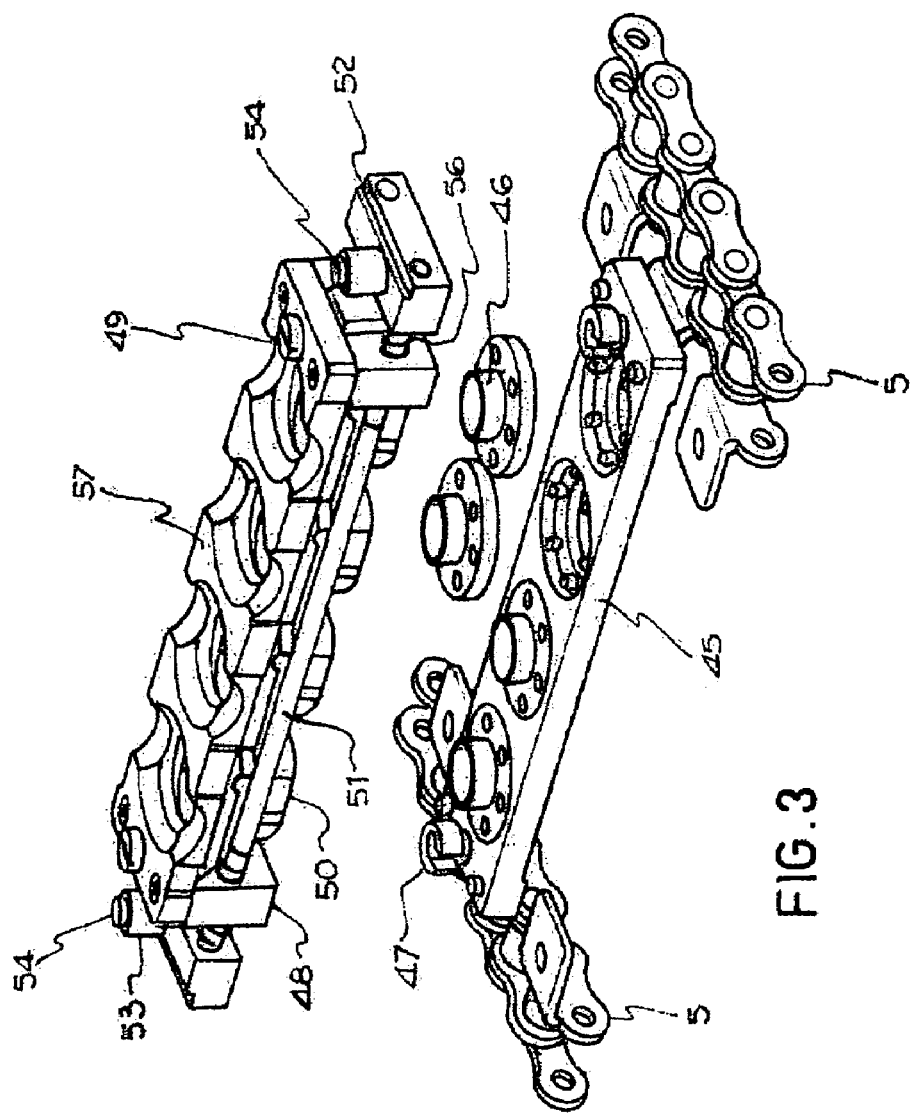
FIG. 3 is a perspective view of the fruit aligning and engagement system of the pitting apparatus which is the object of this invention.
Figure 3:
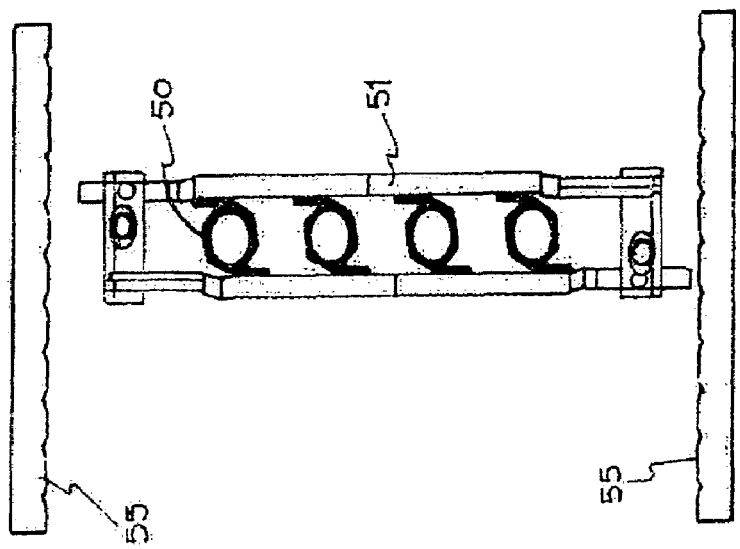

As can be seen on FIG. 3, orientation means are constituted by a tablet 45 laterally associated to said chains 5 by means of screws 47. Said tablet 45 houses rubber supports 46 and is associated to bearings 48 by means of special screws 49 which are adjusted on said screw 47 head. These bearings 48 support prune buckets 50 rigidly connected to an axis 51 and the latter, in turn, is rigidly connected to pushing die 52 on one end and axially slidable on the other. This kind of connection allows axial opposite movement between pushing dies 52 of both ends of said axis 51. Axial movement of each prune bucket 50/axis 51 assembly is enabled through rolls 53 and bolts 54.

Upon the translation movement of conveyor belt 17, roll 53 rests on cam tracks 55 and thus compresses or reduces the space between prune buckets 50, and by means of a spring 56 it is able to alternatively open and close, and in this manner there is attained, first, orientation of fruit 25 and then holding thereof upon pitting and further, the discharge thereof after pitting is accomplished. Optionally and as a complement a tablet cover 57 may be included, which cover is screwed on bearings 48.

Figure 4:
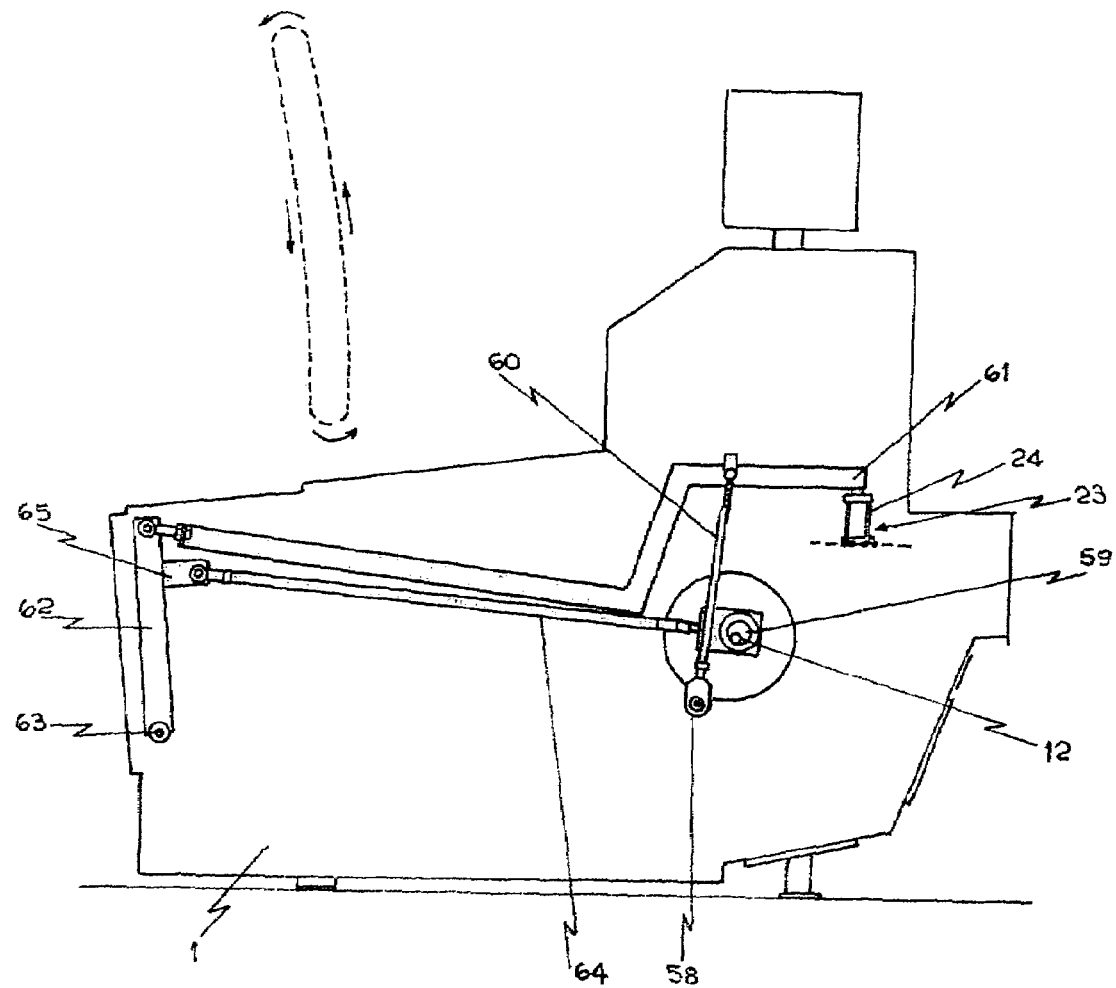
FIG. 4 is a side view of the punching mechanism of the pitting apparatus which is the object of this invention. A preferred embodiment of the plums or dates pitting machine of this invention is shown by FIGS. 1 and 2. The machine is constituted by a chassis 1 and widely known fruit traction, vibration, selection, separation and orientation means.

As previously mentioned, one of the ends of punching header 61 bears spring-free punches 24, which carry out an orbital type movement and during their trajectory should pierce fruits 25 within full translation movement. In order to attain such a synchronism, as can be seen on FIG. 4, the inventive machine has the following combination of mechanical means: at least two eccentrics 59 mounted on a central axis 12 arranged under the pitting area 23, said at least two eccentrics 59 being located externally to said chassis 1, and each of them being articulately connected to at least one crankshaft 58 and to one end of horizontal connecting rod 64, said crankshaft 58 being in turn connected to one end of a vertical connecting rod 60 and the other end of said vertical connecting rod 60 being articulately connected to one of the sides of the end of said punching head 61 which includes punches 24, each of the sides of the other end of said punching head 61 being articulated to one of the ends of an oscillating post 62 placed externally to said chassis 1, and the other end of said oscillating post 62 being articulated to a pivot axis 63 rigidly mounted on said chassis 1; both oscillating posts 62 also comprising at some point between their ends a projection 65 on which the other end of said horizontal connecting rod 64 articulates.

This combination of means, and more particularly the location of pivot axis 63 allows punches 24 to perform a curvilinear oscillating movement which is not perpendicular to the machine direction but does not affect pitting efficiency. In fact, said oscillating movement draws a large radius curve, which renders said movement substantially rectilinear. It may also be appreciated on said FIG. 4 an orbital diagram illustrating the trajectory of the end of a punch 24.

What is claimed is:

1. A fruit pitting machine comprising:
   a fruit loading area for loading fruit into the pitting machine;
   a fruit pitting area where pits are removed from the fruit;
   a fruit unloading area for unloading fruit from the pitting machine;
   a fruit vibration, selection, separation, and orientation apparatus;

a closed loop conveyor belt that moves fruit from the fruit loading area through the fruit pitting area, towards the fruit unloading area, the closed loop conveyor belt comprising a plurality of fruit containers that alternatively close and open; and a punching head with a plurality of punches positioned over said closed loop conveyor belt in the fruit pitting area, said punching head being associated to actuating means in a way that one end of a vertical connecting rod is articulated to one end of said punching head, another end of said vertical connecting rod is connected to a crankshaft articulately connected to an eccentric, wherein another end of said punching head is articulately associated to one end of an oscillating post, another end of said oscillating post being articulated to a pivot axis, comprising said oscillating post, at some point between its ends, a projection on which an end of a horizontal connecting rod articulates, said eccentric being articulately connected to another end of said horizontal connecting rod, said actuating means being located externally to the machine, below said punching head, and providing a closed-loop curvilinear orbital movement of said punching head with respect to the conveyor belt, moving the punches through the fruit pitting area.

2. The machine of claim 1, wherein the orbital movement of the punching head is synchronized with the conveyor belt such that the punches drive through the fruit on the conveyor when the fruit is located within the pitting area.

3. The machine of claim 1, further comprising a fruit selections means for rejecting certain fruit using rejecting brushes that allow entering of one fruit into each container of conveyor belt.

4. The machine of claim 1, wherein the fruit unloading area comprises an unloading bin wherein pitted fruit falls due to gravity.

5. The machine of claim 4, further comprising a vibration means that confers a vibration in order for said belt to discharge fruit not discharged at the fruit unloading area.

6. The machine of claim 1, further comprising a separation plate placed over the fruit containers and under the pitting head.

7. The machine of claim 6, wherein the separation plate comprises a plurality of parallel flat rods that are spaced by a distance smaller than the diameter of each fruit container and larger than the diameter of each of the punches.

8. The machine according to claim 1, further comprising orientation means that are conformed by a tablet laterally connected to chains through screws, said tablet housing rubber supports and supporting bearings through special screws which fit said screws heads; said bearings support buckets rigidly connected to an axis and this in turn rigidly connected to a die on an end and axially slidable on the other end, in order to allow for opposed axial movement between pushing dies from one end and that of the opposite end of said tablet, wherein said axial sliding is attained by means of rolls and bolts.

9. The machine according to claim 8, wherein said rolls rest on cam tracks which compress or reduce the space between said buckets, and said containers alternatively open and close by means of a spring.

10. The machine according to claim 9, wherein the machine optionally includes a tablet cover which is screwed onto said bearings.

11. A pitting machine comprising:
a chassis;
a fruit loading area;
a fruit pitting area;
a fruit unloading area;
fruit traction, vibration, selection, separation and orientation means associated to said chassis;
a closed loop conveyor belt that moves between the fruit loading area, fruit pitting area, and fruit unloading area;
a plurality of fruit containers that alternatively close and open, said containers being mounted on said closed loop conveyor belt; punching head including a plurality of spring-free punches; and
actuating means for articulating said punching head in a curvilinear eccentric orbital movement with respect to the conveyor belt, wherein said actuating means comprise at least two eccentrics mounted on a central axis arranged under the pitting area, said at least two eccentrics being positioned externally to said chassis, each of said eccentrics being articulately connected to at least one crankshaft and to one end of a horizontal connecting rod, said crankshaft being in turn connected to one end of a vertical connecting rod whereas another end of said vertical connecting rod is articulated to an end of said punching head which includes punches, another end of said punching head being articulately associated to one end of an oscillating post placed externally to said chassis, another end of said oscillating post being articulated with a pivot axis rigidly mounted on said chassis, comprising said oscillating post, at some point between its ends, a projection on which the other end of said horizontal connecting rod articulates.

12. The machine according to claim 11, wherein said actuating means are positioned under the pitting area.

13. The machine according to claim 11, wherein said actuating means are synchronized with the movement of said conveyor belt.

14. The machine according to claim 11, further comprising traction means comprising a main axis mounted on bearings and supported on gears that pull closed loop parallel chains connected to said main axis by means of other axes.

15. The machine according to claim 14, wherein said other axes comprise a rear axis, an intermediate axis, and a return axis.

16. The machine according to claim 14, wherein said main axis bears a crown or gear controlled or driven from a gear or pinion which is mounted on a central axis by means of a chain.

17. The machine according to claim 16, wherein said central axis is mounted on gears and arranged under said pitting area, and the conveyor belt is controlled or driven by gear by means of a chain from a driving pinion which is directly coupled to an overstress clutch of a reducing motor.

18. The machine according to claim 11, further comprising selection means comprising rejecting brushes that allows entering of one fruit into each container of conveyor belt.

19. The machine according to claim 18, wherein said rejecting brushes are driven from an intermediate axis, said rejecting brushes being actuated by said conveyor belt; said intermediate axis being in turn mounted on a gear that, through a chain, rotates smaller gears which are mounted on axes of the rejecting brushes.

20. The machine according to claim 11, wherein said loading area comprises a loading bin that is associated to vibration means including a motor with a pulley; said vibrating means in turn supported by bearings associated to an eccentric counterweight which upon rotation generates an orbital vibration that is transmitted to a vibrating axis and to bearings which are connected to tracks which bear said conveyor belt; said tracks are in turn supported by regulators that limit and regulate vibration thereof.

21. The machine according to claim 11, wherein said fruit unloading area comprises an unloading bin wherein pitted fruits fall due to gravity and is complemented by vibration means comprising a cam that confers a vertical vibration to aid in discharging those fruits not discharged at said unloading area.

22. The machine according to claim 11, further comprising separation means that placed over said fruit containers and under said punching head, said separation means defining a plurality of parallel flat rods that are spaced by a distance smaller than the diameter of each container and larger than the diameter of each punch.

* * * * *